Patented May 30, 1939

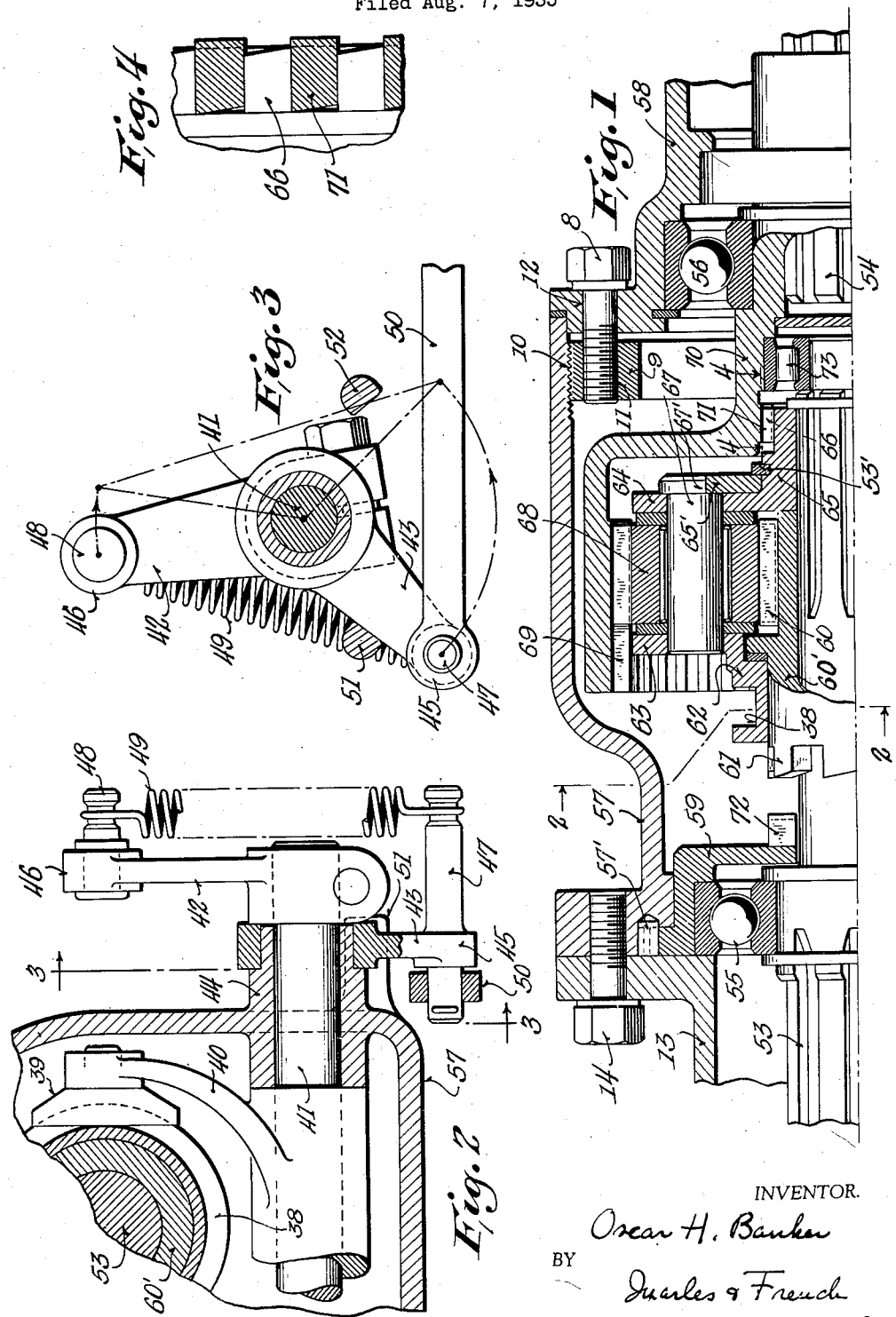

2,159,980

UNITED STATES PATENT OFFICE 2,159,980

OVERDRIVE GEARING

Oscar H. Banker, Chicago, Ill., assignor to New Products Corporation, Chicago, Ill., a corporation of Delaware Application August 7, 1935, Serial No. 35,056

2 Claims. (Cl. 74—290)

The invention relates to change speed transmission mechanisms.

The object of the invention is to provide a simple and efficient planetary type overdrive transmission that is under the direct control of the operator and in which the shifts are effected without using the engine clutch and in which there is no connection through the gearing on direct drive but a direct connection between the drive and driven shafts, thus eliminating noise that may arise through the backlash action of the teeth of the gearing.

A further object of the invention is to provide a planetary overdrive transmission of the type above described in which it is not necessary to alter the position of the parts of the overdrive to effect a reverse.

The invention further consists in the several features hereinafter described and more particularly defined by claims at the conclusion hereof.

In the drawing:

Fig. 1 is a half vertical sectional view of a transmission mechanism embodying the invention, some of the parts being shown partly in elevation;

Fig. 2 is a detail sectional view taken on the line 2—2 of Fig. 1;

Fig. 3 is a detail sectional view taken on the line 3—3 of Fig. 2;

Fig. 4 is a detail sectional view taken on the line 4—4 of Fig. 1.

In Figs. 1 and 2 of the drawing, the numeral 57 designates a casing section and 58 another casing section detachably secured together by the bolts 8 and in order that there may be no protruding bosses and the exterior dimensions of these casing parts be reduced to a minimum the section 57 has a removable bolt anchorage in the form of a ring member 9 in threaded engagement at 10 with the inner wall of said section and provided with threaded holes 11 to receive the bolts 8 which pass through openings 12 in the section 58. This connection is further shown and particularly claimed in a companion application Serial No. 35,054, filed August 7, 1935. The section 57 is secured to the propeller shaft housing 13 by the bolts 14.

The drive shaft 53 and the driven shaft 54 aligned therewith are journalled in the housing formed by the casing sections 57 and 58. A ball bearing journal 55 for the drive shaft has its inner race mounted on said shaft and its outer race mounted in a flanged ring portion 59 of a jaw clutch element 72 which is secured to the housing by being clamped between the section 57 and the adjacent portion of the housing 13 and is keyed to the first named section by a key 57'.

In this construction the planet gears and carrier with the shiftable overrunning clutch element are arranged to be shifted as a unit.

A sun gear 60 is loosely mounted on the drive shaft 53, and its hub 60' has a jaw clutch face formed on one end with clutch teeth 61, and it also forms a bearing for the hub 62 of a part 63 of a planetary carrier.

A part 64 of the planetary carrier has its hub 65 slidably splined or keyed to the drive shaft 53 and provided with jaw clutch teeth 66. The parts 63 and 64 are secured together and arranged in spaced relation by suitable bolts (not shown) and said carrier has the pinion shafts 67 detachably mounted in said parts and to the planet pinions 68. As herein shown, each planet shaft 67 is locked in position by having its shouldered head 67' engage a locking plate 65' held to the part 65 of the planetary carrier by a split locking ring 53'.

The planet pinion 68, two or more in number and only one of which is shown, mesh with the sun gear 60 and with an orbit gear 69 whose hub 70 is splined to or formed integrally with the driven shaft 54 and has jaw clutch teeth 71 formed on it and adapted to mesh with the jaw clutch teeth 66 in one position of the drive mechanism. The hub 70 of the orbit gear is journalled in a ball bearing journal 56 interposed between it and the casing section 58 and the inner end of the shaft 53 is journalled in a ball bearing journal 73 interposed between it and said hub 70.

The clutch element has jaw clutch teeth 72 formed on it adapted to mesh with the mating teeth 61 on the hub of the sun gear and provide a jaw clutch of the overruning type, the teeth having inclined faces.

The teeth 66 on the planetary carrier hub cooperate with the teeth 71 on the hub of the orbit gear to form a jaw clutch of the overrunning type, the teeth having inclined faces as shown in Fig. 4. The hub 62, the parts 63 of the planetary carrier have an annular groove 38 in which the pivoted slipper ends 39 of a shifter fork 40 are mounted, said fork being secured to a shaft 41 journalled in the casing section 57 and having an exteriorly disposed crank arm 42 secured thereto.

A crank arm 43 is mounted to pivot on a boss 44 of the housing concentric with the shaft 41 and its end 45 is disposed to operate in an arc below the center of the arc through which the end 46 of the crank 42 operates. These ends have pins 47, 48, respectively, secured thereto and connected by a coiled spring 49. The pin 47 also has a push or pull member connected thereto as a link 50 which may be actuated in any suitable manner by the operator from his position in the vehicle. The movement of the arm 43 is limited by the stops 51 and 52.

The sun gear 60, planetary carrier including parts 63, 64, 67, and the pinions 68 are through the above described mechanism shiftable as a unit along the shaft 53, the teeth of the orbit gear 69 being long enough so as to retain the meshing engagement with said pinions in either of their positions.

In Fig. 1 the parts are in position for direct drive through the intermeshing clutch teeth 66 and 71 since the hub 65 is keyed to the drive shaft 53 and the hub 70 is keyed to the driven shaft 54, and it will be noted that under these conditions the gearing itself does not serve to lock the drive and driven shafts together and hence noise that might otherwise occur through the backlash action of the teeth of the gearing is eliminated. If now the operator wants to go into overdrive, he pulls the link 50 to bring the arm 43 against the stop 52 and this puts the spring 49 in tension and tends to pull the arm 42 toward the right as viewed in Fig. 3 or toward the left as viewed in Fig. 2 and thus tends to shift the clutch assembly including the parts 60' and 65 toward the left as viewed in Fig. 1. This pull becomes effective when the torque between the jaws 66 and 71 is broken by temporarily decelerating the speed of the drive shaft 53 as by the driver's momentarily taking his foot off the accelerator, and then the spring 49 acts on the shifter mechanism above described to shift the sun gear and planet carrier to a position in which the teeth 61 will mesh with the teeth 72 and this locks the sun gear 60 against rotation, and then as the operator again feeds the gas or accelerates the speed of the drive shaft, the planet pinions 68 will revolve about the stationary sun gear 60 and drive the orbit gear 69 and consequently the shaft 54 at a higher rate of speed than that of the drive shaft 53. If in the condition of overdrive the operator wishes to change back to direct drive, he sets the control by a push on the link 50 to shift the arm 43 to the full line position shown in Fig. 3 against the stop 51 putting the spring 49 under tension and tending to swing the arm 42 to the full line position, and this movement is effected and engagement of the jaws 66 and 71, when the previous engagement of the jaws 72 and 61 is broken by a temporary deceleration of the drive shaft 53 followed by the movement of the sun gear and planet carrier assembly to the position shown in Fig. 1, which engagement is effected by the operator again accelerating or feeding the gas. In this construction the shiftable clutch element or member is formed by the hubs of the sun gear and planetary carrier.

It is also to be noted that the gearing drives in the same direction in either of its operating positions so that it is not necessary to alter the position of the parts of the overdrive on a reversal of the drive of the drive shaft 53.

This application is directed to certain modifications of the overdrive mechanism shown and described in my copending application Serial No. 728,247, filed May 31, 1934.

I desire it to be understood that this invention is not to be limited to any particular form or arrangement of parts except in so far as such limitations are included in the claims.

What I claim as my invention is:

1. In a change speed gearing, the combination of a drive shaft, a driven shaft, change speed planetary gearing between said shafts including a sun gear and a planetary carrier shiftable as a unit relative to said drive and driven shafts and having a pinion mounted thereon meshing with said sun gear, said carrier being operatively connected with said drive shaft, an orbit gear connected to said driven shaft and meshing with said pinion, said shiftable unit provided with clutch jaws, a clutch jaw associated with said driven shaft and adapted to engage one of said clutch jaws in one position of said shiftable unit for direct connection between said shafts independent of said gearing, a relatively fixed clutch jaw adapted to engage the other of said clutch jaws in the other position of said shiftable unit for holding said sun gear stationary, means for shifting said unit, the jaws of said clutches being of the overrunning type.

2. In a change speed gearing, the combination of a drive shaft, a driven shaft, change speed planetary gearing between said shafts including a sun gear and a planetary gear carrier shiftable as a unit relative to said drive and driven shafts and having a pinion mounted thereon meshing with said sun gear, said carrier being operatively connected with said drive shaft, an orbit gear connected to said driven shaft and meshing with said pinion, said shiftable unit being provided with clutch jaws, one jaw on the hub of the planetary carrier and the other jaw on the hub of the sun gear, a clutch jaw associated with the driven shaft and adapted to engage the clutch jaw on the hub of the planetary carrier in one position of said shiftable unit for direct connection between said shafts independent of said gearing, a relatively fixed clutch jaw adapted to engage the clutch jaw on the hub of the sun gear in the other position of said shiftable unit for holding said sun gear stationary, means for shifting said unit, the jaws of said clutches being of the overrunning type.

OSCAR H. BANKER.